United States Patent [19]

Perz

[11] 4,297,399
[45] Oct. 27, 1981

[54] METHOD FOR CURING CONCRETE

[75] Inventor: John S. Perz, Mentor, Ohio

[73] Assignee: Martin Marietta Corporation, Bethesda, Md.

[21] Appl. No.: 110,294

[22] Filed: Jan. 8, 1980

[51] Int. Cl.³ ............................................. B05D 1/00
[52] U.S. Cl. .................................. 427/385.5; 106/12; 106/238; 106/239; 427/393.6; 428/497
[58] Field of Search ..................... 106/238, 239, 12; 427/385.5, 393.6; 428/497; 264/DIG. 43

[56] References Cited

U.S. PATENT DOCUMENTS

| | | | |
|---|---|---|---|
| 1,765,616 | 6/1930 | Roman | 106/238 |
| 2,166,711 | 7/1939 | Beach | 106/239 |
| 2,306,114 | 12/1942 | Bent et al. | 106/239 |
| 2,333,887 | 11/1943 | Redlinger | 106/238 |
| 3,189,469 | 6/1945 | Littler et al. | 106/12 |
| 3,522,070 | 7/1970 | Webb | 106/173 R |
| 3,801,340 | 4/1974 | Ellis | 106/238 |

Primary Examiner—Lorenzo B. Hayes
Attorney, Agent, or Firm—Ronald G. Ort; George W. Moxon, II; Gay Chin

[57] ABSTRACT

A composition and process for improving the curing of concrete, the composition comprising a Singapore dammar resin dissolved in an organic solvent. In a preferred embodiment of this invention, the resin-solvent solution is dispersed in a water-based emulsion by the use of an appropriate emulsifying agent. A preferred organic solvent is mineral spirits, and preferably the organic solvent contains a low enough level of photochemically reactive liquids to meet air pollution requirements such as Los Angeles Rule 66.

9 Claims, No Drawings

METHOD FOR CURING CONCRETE

BACKGROUND OF THE INVENTION

This invention relates to compositions and a process for curing concrete, and more particularly to the use of curing compositions comprising natural resins.

The setting and hardening of concrete, also known as curing, requires, among other things, the presence of a proper amount of water to effect the hydration of the cement in the concrete mix. If an excessive amount of water evaporates from the mix during the curing process, then the concrete will not achieve its necessary or desired strength and the concrete article may shrink, causing cracks to form. Frequently, in order to prevent or to retard the evaporation of water during the early hardening period and to permit the proper hydration of the cement and curing of the concrete, curing compounds, such as liquid, membrane-forming materials, are applied to the surface of freshly-poured concrete. The curing compound is then allowed to remain on the surface of the concrete until the completion of the curing process, which is normally about one to four weeks from the time the concrete is placed.

Compositions comprising synthetic or natural resinous materials dissolved in solvents have been used as waterproofing agents and as curing compositions. These solutions are applied to freshly-poured concrete surfaces, and the solvents are allowed to evaporate to leave substantially resinous coatings which act to retard the evaporation of water from the concrete. Many of these compositions, particularly those which are intended as waterproofing agents, remain on the concrete surface indefinitely, to prevent the passage of water in either direction through the surface.

At times, it may not be desirable to have such coatings remain on the concrete surfaces after the completion of the curing period. For example, the residual coating material may interfere with the application of other materials to the concrete surfaces, such as floor tile, where the residual curing compound can inhibit the bonding of the tile adhesive to the concrete, or surface sealers, e.g., linseed oil, which might be applied to a surface because it will be subjected to excessive de-icing salt applications. These types of problems can impose significant limitations on the use of curing or waterproofing compounds specifically designed for their ability to remain on concrete surfaces indefinitely.

Another troublesome feature of prior art curing compounds is that many of the organic solvents which have been used in such compounds have been found to contribute to air pollution, and their use has been curtailed or banned in many jurisdictions. This is a particular problem because many of the previously used resins are only soluble in aromatic solvents, such as those containing high levels of benzene or toluene, and such solvents have been subject both to air pollution and occupational safety restrictions.

There are many such regulations restricting the use of these solvents, but one which is particularly well known and used as a model in many jurisdictions is "Rule 66" enacted by the City of Los Angeles, California to reduce the emission of photochemically reactive volatile liquids into the atmosphere. Although this rule is of course subject to legislative change, for purposes of this specification and whenever referred to hereinafter, the definition of liquids and solvents which violate Rule 66 is:

"1. Any liquid, including water, which contains more than a 20 volume percent aggregate total of:
  a. All olefinic or cycloolefinic compounds, and
  b. All substituted aromatic hydrocarbons, and
  c. The branch chain ketones, and trichloroethylene
2. Any liquid, including water, which contains more than the indicated percentage concentrations of combinations of the following groups of solvents:
  a. 5 volume percent total blends of olefinic or cycloolefinic compounds, or
  b. 8 volume percent of blends of aromatic hydrocarbons (except toluene and ethyl benzene), or
  c. 20 volume percent total of blends of toluene, ethyl benzene, branch chain ketones, and trichloroethylene"

There are commercially available solvents specifically formulated to meet the requirements of Los Angeles Rule 66, but these have generally been found not to be suitable as solvents for the resins previously used in curing compounds. Thus, such curing compounds may not be able to be used in jurisdictions which have regulations corresponding to Rule 66.

Other less desirable features found in many of the previously employed curing compounds relate to the resin which is used. Many resins tend to turn yellow or darken on exposure to sunlight, making them unsuitable for coating certain outdoor work, such as light-colored building exteriors or other colored surfaces. Synthetic resins, which are generally petroleum derivatives, have become more and more expensive and difficult to obtain due to the world crude oil situation. Many natural resins require costly processing to remove undesirable materials or to modify their chemical composition before they are suitable for use as curing agents. Furthermore, some natural resins are far more scarce and expensive then others.

SUMMARY OF THE INVENTION

In accordance with the present invention, a curing compound is provided which will remain intact on the surface of freshly-poured concrete for a sufficient time for the concrete to cure, after which the coating can disintegrate and fracture off the surface of the concrete allowing the surface to be subsequently treated in any desired manner, is non-yellowing, and comprises essentially a solution of a natural resin, known as Singapore dammar, dissolved in an organic solvent. The solution may be used directly as a curing composition or may be dispersed in water, as an emulsion, in which case the water-based emulsion would be the curing composition.

Another characteristic of Singapore dammar which makes it particularly suitable for use in the curing compounds of the present invention is that it is soluble in non-aromatic as well as aromatic solvents. Thus, the solvent used in accordance with the present invention can be either non-aromatic or aromatic. In accordance with a preferred embodiment of the present invention, the solvent is a low-aromatic solvent containing not more than about 8% by volume aromatics. In accordance with another preferred embodiment of the present invention, the solvent comprises mineral spirits, and more preferably mineral spirits which contain not more than about 8% aromatics and which meet the requirements of Los Angeles Rule 66.

To make the curing composition of the present invention, Singapore dammar resin is dissolved in a solvent, and then filtered to remove undissolved impurities. It is then ready for use on concrete. A feature which distinguishes the method and composition of the present invention is that unrefined crude Singapore dammar can be used without the need for costly processing or refining.

In another embodiment of the present invention, it was found that the dammar resin could be successfully dispersed in a water-based emulsion. In such an emulsion, the amount of organic solvents employed is significantly lowered, thus making the coating even more suitable for use where air pollution is a problem.

It is therefore an object of this invention to provide a natural resin concrete-curing composition comprising a Singapore dammar resin in an organic solvent for application to wet concrete surfaces.

Another object is to provide such a composition which will disintegrate and fracture off the surface of the concrete after curing is complete.

A further object is to provide such a curing composition in which the solvent is generally non-polluting.

A still further object is to provide such a composition in which the resin does not yellow or darken on exposure to sunlight.

An additional object is to provide such a composition in which the resin requires no processing or refining before it is mixed into the curing composition.

Another object is to provide a concrete-curing composition comprising Singapore dammar resin dispersed in a water-based emulsion.

Other objects and advantages will be apparent from the following detailed discussion of the present invention.

DETAILED DESCRIPTION OF THE INVENTION

The preferred resin for use in the curing composition of the present invention is a Singapore dammar resin. Singapore dammar is a class of resins which are obtained from trees found in the Indonesian Islands, and is a standard resin designation in accordance with the classification set forth by the American Gum Importers Association in its "Natural Resins Handbook" published in 1939. This type of resin is commercially available and is soluble in non-aromatic as well as aromatic solvents. It was found suitable for forming a concrete-curing film which is colorless and non-yellowing, which maintains its continuity during the curing period, and which then disintegrates and fractures off the surface.

The only requirement of the organic solvent of the present invention is that it must be capable of dissolving the Singapore dammar resin. This resin is soluble in either aromatic or non-aromatic solvents, but is more soluble in the aromatic solvents. Because the resin is more soluble in aromatic liquids than non-aromatic liquids, it is preferable for the solvent to contain some aromatics. However, in order to minimize the air-polluting characteristics of the solvent, preferably the solvent contains no more than about 8 percent by volume aromatics. More preferably the solvent meets the requirements of Los Angeles Rule 66, as previously enumerated.

Another preferred solvent for use in the present invention is one selected from those generally designated "mineral spirits", which are well-known low-volatility petroleum distillates, and which generally meet the requirements of air pollution regulations. More preferably, the mineral spirits will contain not more than about 8 percent by volume aromatics and conform to the requirements of Los Angeles Rule 66.

The curing composition of the present invention can be prepared simply by dissolving unprocessed resin in the solvent and then filtering out any undissolved solids. In the case of Singapore dammar resin, the resin may be in its raw state in which pieces of bark, wood, stones, sand or other impurities are dispersed in the solid resin. After dissolving this resin in mineral spirits or other suitable solvent, the impurities are readily removed by filtration, and the solution is ready for use as a curing agent.

In another embodiment of this invention, the solution of resin and solvent is mixed and emulsified with water, employing suitable emulsifying agents. Since these solvents are generally immiscible with water, emulsification is usually necessary. In such cases the curing composition is a water-based emulsion requiring less of the organic solvent.

The curing composition should be applied to set fresh concrete surfaces which are still damp but from which most of the bleed water has evaporated. This is at the stage when bleed water ceases to appear on the surface of the concrete. For best results, the surface should be nearly free of all bleed water before applying the present curing composition. The composition may be applied by any suitable means such as spraying, rolling or brushing, although spraying is generally preferred for ease of application. After the curing composition is applied to the concrete surface, the composition is allowed to dry, during which most of the solvent will evaporate to leave a curing coating composed primarily of the resin.

Because the resultant coating is composed primarily of the resin, the density of that coating will be a function of the application rate and resin concentration in the solution. Obviously, lowering the concentration of resin in the solution will increase the amount of solution which will have to be applied to obtain a desired coating density. This will, of course, increase the amount of solvent which will have to be evaporated, which is undesirable, among other reasons, because of the cost of the solvent and the resultant air-pollution problems. Therefore, it is desirable to use a solution with a high concentration of resin to reduce the amount of solvent used.

On the other hand, increasing the concentration of resin also increases the viscosity of the solution. Therefore, the concentration of the resin should not be so high that the solution becomes difficult to apply. Furthermore, the resin concentration should be limited in accordance with the desired density of the resultant coating, since excess resin would add unnecessary cost and may be detrimental.

It was found that good sprayable coating compositions were obtained with solutions containing a minimum of about 20 percent by weight resin, with better results obtained for solutions of over about 27 percent by weight resin and best results when the resin concentration was over about 30 percent by weight. The preferred minimum of 27 percent resin is particularly applicable when the solvent is mineral spirits, because, for reasons which are not fully understood, it was found that at lower concentrations complete solubilization of the resin was difficult to achieve. It was also found that in mineral spirits no more than about 55 percent by weight resin could be dissolved. Good results were obtained with curing compositions containing less than about 40 percent by weight resin. Best results were obtained with compositions containing about 30 to 35 percent by weight resin.

Optionally, other materials may be added to the resin-solvent composition for their known uses. For example, known ultraviolet absorbers may be added to decrease the effect of sunlight on the resin coating. This extends the time before which the resin coating disintegrates. Because the curing compositions of the present invention are only intended to be temporary coatings, it may not be necessary or even desirable to inhibit the action of the sunlight. This is because, as previously discussed, it is desirable for the curing coating to disintegrate off the concrete surface. Additional optional additives include pigments, plasticizers, and antioxidants. In particular, the addition of white pigment may be useful to increase the sunlight reflectivity of the surface, thus cooling the concrete surface and reducing moisture loss.

EXAMPLE I

As examples of the curing composition of the present invention, samples were prepared using Singapore dammar resin dissolved in mineral spirits. The Singapore dammar resin used was Grade No. 1 Singapore Dammar obtained from the O. G. Innes Corporation of New York, New York, and is a standard commercially available product. The solvent was obtained from the Ashland Chemical Company, and was low-aromatic mineral spirits sold under the trademark KWIK-DRI. This solvent is a commercially available product mainly comprising paraffins and naphthenes, and containing less than 7.5 percent by volume of aromatics in order to meet the air pollution requirements of Los Angeles Rule 66. A typical composition for this solvent was, by volume percent, 55.1% paraffins, 37.6% naphthenes, 0.3% olefins, and 7.0% aromatics.

Test specimens were prepared for testing this curing composition in accordance with ASTM test designation C-156-71 for "Water Retention by Concrete Curing Materials." The curing composition samples were prepared by dissolving the raw resin in the solvent, and then filtering the mixture through glass wool to remove undissolved materials. The filtered solution was then applied to freshly set, damp concrete surfaces, which, in accordance with ASTM C-156-71, neither had surface water on them nor were dry below the surface. That is, the concrete was at the point when mix water ceases to bleed through the surface, for which a specific test procedure is provided in ASTM C-156-71.

Test samples were prepared using curing compositions with different concentrations of resin, as set forth in Table I below. The concentrations are in weight percent of dammar resin, the application rates in square feet per gallon (and parenthetically in square meters per cubic decimeter, computed on a rough ratio of 200 ft²/gal equals 5 m²/dm³), and the measured moisture loss in grams per square centimeter.

TABLE I

| Sample No. | Concentration Wt. % | Appln. Rate ft²/gal | (m²/dm³) | Moisture Loss g/cm² |
|---|---|---|---|---|
| 1 | 25 | 200 | (5) | 0.070 |
| 2 | 27 | 200 | (5) | 0.048 |
| 3 | 30 | 200 | (5) | 0.044 |
| 4 | 30 | 200 | (5) | 0.042 |
| 5 | 30 | 300 | (7.5) | 0.040 |
| 6 | 30 | 450 | (11.25) | 0.059 |

TABLE I-continued

| Sample No. | Concentration Wt. % | Appln. Rate ft²/gal | (m²/dm³) | Moisture Loss g/cm² |
|---|---|---|---|---|
| 7 | 35 | 200 | (5) | 0.032 |
| 8 | 35 | 300 | (7.5) | 0.041 |
| 9 | 35 | 450 | (11.25) | 0.059 |

The maximum moisture loss allowed in accordance with the requirements of ASTM C-309-73 is 0.055 g/cm² when the coating is applied at a rate of 200 ft²/gal (5 m²/dm³). Except for sample 1, which contained only 25% resin, all of the other samples easily met the requirements for moisture loss, even when applied at the rate of 300 ft²/gal (7.5 m²/dm³). Even at 450 ft²/gal (11.25 m²/dm³), which is more than twice the required application rate, the moisture loss was only slightly over the allowed maximum.

Further examination of the above samples indicated that the curing composition did not yellow or otherwise discolor during the test period. As a further test of the non-yellowing property of this curing composition, samples of the curing composition were applied over white concrete surfaces at the rate of 200 ft²/gal (5 m²/dm³). After two months of exterior exposure, these surfaces showed no significant amount of yellowing. Because two months is well beyond the normal amount of time required for concrete curing, this test shows that the composition of the present invention is generally non-yellowing during its useful life.

Additional tests were conducted to determine the disintegration time of the coatings formed in accordance with the present invention. It was found that such coatings disintegrated in sunlight within a period of about one to two weeks. Furthermore, this disintegration period could be extended to about three to four weeks by the use of ultraviolet inhibitors. Since the normal curing period for concrete is in the range of about one to four weeks, compositions in accordance with the present invention are able to act as curing compounds during the curing period.

EXAMPLE II

It was found that the surface life of the resin film could be extended by the use of additives to increase the flexibility of the coating and to prevent its premature embrittlement. The composition of this example of the present invention was modified by the addition of several commercially-available additives. A plasticizer was added to increase the flexibility of the resin film. An ultraviolet absorber was added to inhibit the embrittling effect of the ultraviolet component of natural sunlight. Also two antioxidants were added to prevent the oxidation and cross-linking of the resin film, which can result in embrittlement and yellowing.

The plasticizer used in this example was an octyl epoxy tallate plasticizer sold under the trademark and designation DRAPEX 4.4 by the Argus Chemical Corporation. The ultraviolet absorber used was a substituted benzotriazole sold by the Ciba-Geigy Corporation under the trademark and designation TINUVIN 328, which has the chemical name 2-(2-hydroxy-3,5-di-t-pentylphenyl)-benzotriazole. The first of the two antioxidants used was an antioxidant sold under the trademark and designation CYANOX LTDP by American Cyanamid Company, which has the chemical name dilauryl-thiodipropionate. The second antioxidant was a high molecular weight sterically-inhibited phenol sold by the Ciba-Geigy Corporation under the trademark and designation IRGANOX 1076, which has the chemical name octadecyl 3,5-di-tert-butyl-4-hydroxyhydrocinnamate.

The specific composition of this example was:

| Component | Percent by weight |
|---|---|
| Singapore dammar | 28.55 |
| Plasticizer | 0.85 |
| Ultraviolet absorber | 1.90 |
| First antioxidant | 1.52 |
| Second antioxidant | 0.58 |
| Mineral spirits | 66.60 |

A test sample was coated with this composition, and the measured moisture loss was 0.042 g/cm$^2$ at an application rate of 200 ft$^2$/gal (5 m$^2$/dm$^3$), well below the previously-discussed ASTM maximum allowable loss of 0.055 g/cm$^2$ at that application rate.

A concrete test surface was coated with this composition and subjected to exterior exposure. The resin film remained intact for a period of four weeks before starting to disintegrate. Thus this coating would be suitable for providing protection from moisture loss for freshly-poured concrete during a curing period of up to four weeks.

EXAMPLE III

Further reduction of the use of solvents which may contribute to air pollution can be achieved by dispersing the Singapore dammar in a water-based emulsion. Although the resin is not directly soluble in water, it is possible to form a water-based emulsion wherein the resin is dissolved in an organic solvent, and that solution is dispersed in water by the use of emulsifying agents.

The following is an example of such a water-based emulsion curing composition made in accordance with the present invention. The specific composition for this example was:

| Component | Percent by weight |
|---|---|
| Singapore dammar | 29.060 |
| Oleic acid | 2.585 |
| Ethanolamine | 0.710 |
| Antifoaming agent | 0.005 |
| Mineral spirits | 23.780 |
| Water | 43.860 |

The Singapore dammar and mineral spirits were the same as those used in the previous examples. The oleic acid and the ethanolamine, which are well-known commercially-available chemicals, acted as the emulsifying agent. An antifoaming agent was used to minimize the foaming of the emulsion, a problem often present when water-based mixtures are agitated. In this case the antifoaming agent was one manufactured and sold by the Dow Corning Corporation under the designation Antifoam B emulsion, which is a silicone-based emulsion.

To make the emulsion of Example III, the dammar resin was dissolved in the mineral spirits, as described in connection with Example I. The solution was then stirred at high speed and the oleic acid was added. The water, which had been precombined with the ethanolamine and antifoaming agent, was then added slowly to the rapidly stirring mixture, to form an emulsion of the water and mineral spirits. The oleic acid and ethanolamine reacted to form a salt of the oleic acid, which acts as the emulsifying agent as is well known in the art.

This water-based emulsion was then tested on concrete samples and found to yield a moisture loss of 0.055 g/cm$^2$ when applied at a rate of 200 ft$^2$/gal (5 m$^2$/dm$^3$) which meets the previously-discussed ASTM requirements. It was found that the resin coating had a surface life of several weeks, with the added advantage that apparently the oleic acid also acts as a plasticizer for the resin.

Although only one water-based emulsion was discussed here, it will be apparent to those skilled in the art that other emulsions can be made using other well-known emulsifying agents. The selection of the emulsifying agents would depend largely on the organic solvent being used. The agents should also be ones which do not adversely affect the previously-discussed desirable characteristics of the curing composition, such as its clear, non-yellowing appearance and its suitability for use where air pollution is a problem.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

I claim:

1. A method for curing concrete comprising applying to the surface of the concrete, as a curing compound, a composition comprising Singapore dammar resin and an organic solvent for said resin.

2. The method of claim 1, further comprising preparing said composition by dissolving raw Singapore dammar resin in the solvent and removing undissolved impurities by filtration.

3. The method of claim 1 wherein the solvent is mineral spirits.

4. The method of claim 1 or 3 wherein the solvent comprises not more than about 8 percent by volume aromatic hydrocarbons.

5. The method of claim 1 or 3 wherein the composition contains about 20 to 55 percent by weight resin.

6. The method of claim 5 wherein the composition contains less than about 40 percent by weight resin.

7. The method of claim 3 wherein the composition contains about 27 to 40 percent by weight resin.

8. The method of claim 1 further comprising forming an emulsion of the solvent and resin solution with water and using the emulsion as the curing compound.

9. The method of claim 8 wherein the organic solvent is mineral spirits and ethanolamine and oleic acid are added as an emulsifying agent.

* * * * *